United States Patent [19]
Needham

[11] 4,337,182
[45] Jun. 29, 1982

[54] POLY (ARYLENE SULFIDE) COMPOSITION SUITABLE FOR USE IN SEMI-CONDUCTOR ENCAPSULATION

[75] Inventor: Donald G. Needham, Bartlesville, Okla.

[73] Assignee: Phillips Petroleum Company, Bartlesville, Okla.

[21] Appl. No.: 247,687

[22] Filed: Mar. 26, 1981

[51] Int. Cl.$^3$ ............................................. C08L 91/00
[52] U.S. Cl. ..................................... 524/609; 29/588; 264/272.17; 357/72; 525/535; 523/212; 523/213
[58] Field of Search ........................ 260/37 R, 18 R; 264/272.17; 357/72; 29/588

[56] References Cited

U.S. PATENT DOCUMENTS

| | | |
|---|---|---|
| 3,496,427 | 2/1970 | Lee . . |
| 3,626,051 | 9/1971 | Liautaud . |
| 3,679,941 | 7/1972 | LaCombe . |
| 3,988,286 | 10/1976 | Edmonds et al. ................ 260/37 R |
| 4,001,863 | 1/1977 | Kobayashi et al. ................... 357/72 |
| 4,034,466 | 7/1977 | Thome ................................. 29/588 |
| 4,134,874 | 1/1979 | Needham ....................... 260/37 SB |

Primary Examiner—Lewis T. Jacobs

[57] ABSTRACT

A composition, suitable for encapsulation-type molding, containing from about 30 to 50 weight percent poly (arylene sulfide), about 10 to about 30 weight percent glass fibers, about 30 to about 60 weight percent of a component that can be glass beads or fused silica and about 0.5 to about 3 weight percent of organic silane. Preferably the composition also contains up to about 2 weight percent of a processing aid. A method for preparing a composition suitable for molding in which there is compounded a masterbatch of glass fiber and poly (arylenesulfide), the masterbatch is reduced to particles, and the masterbatch particles are blended with a sufficient amount of organic silane, additional poly (arylene sulfide) and a component chosen from glass beads and fused silica to provide a composition of about 30 to about 50 weight percent poly (arylene sulfide), about 10 to about 30 weight percent glass fibers, about 30 to about 60 weight percent glass beads, or fused silica and 0.5 to about 3 weight percent organic silane. An article of manufacture comprising a semiconductor chip encapsulated in a molded composition as described above.

15 Claims, No Drawings

POLY (ARYLENE SULFIDE) COMPOSITION SUITABLE FOR USE IN SEMI-CONDUCTOR ENCAPSULATION

BACKGROUND OF THE INVENTION

This invention relates to compositions containing poly (arylene sulfide). In one of its aspects this invention relates to molding compositions suitable for encapsulating semiconductor chips. In another of its aspects this invention relates to a method for preparing compositions suitable for use in encapsulating semiconductor chips. In still another aspect of the invention it relates to a molded composition containing poly (arylene sulfide) encapsulating a semiconductor chip.

There are several different polymers that are known to be useful in molding processes for the encapsulation of electronic parts. Up until this time poly (arylene sulfide) has not been known as useful in compositions that can be used for molding in the encapsulation of semiconductor parts.

In the development of a poly (arylene sulfide) based compound for use in encapsulating semiconductor chips for the electronics industry, three key properties had to be built into the resin: (1) High melt flow to insure easy fill of the multicavity mold, (2) low wash-out or short circuiting of the one mil whiskers which connect the internal components with the outside terminals, and (3) low coefficient of thermal expansion to prevent the resin from cracking after being injection molded onto the heavy metal lead frames that support the multicomponent chips. To achieve these properties a balance had to be struck between the various components used along with the poly (arylene sulfide) in the composition.

It is therefore an object of this invention to provide a composition containing poly (arylene sulfide) that is suitable for molding operations in the encapsulating of semiconductor chips for the electronics industry. It is another object of this invention to provide a method for preparing a composition suitable for molding operations in the encapsulating of semiconductor chips for the electronics industry. It is still another object of this invention to provide encapsulated semiconductor chips for the electronics industry.

Other aspects, objects and the various advantages of this invention will become apparent upon reading this specification and the attached claims.

STATEMENT OF INVENTION

According to this invention, a composition is provided that is suitable for use in encapsulating semiconductor chips. The composition contains from about 30 to about 50 weight percent poly (arylene sulfide), from about 10 to about 30 weight percent glass fibers, from about 30 to about 60 weight percent of a component chosen from glass beads and fused silica, and about 0.5 to about 3 weight percent of organic silane. Preferably the composition also contains up to about 2 weight percent of a processing aid.

In one embodiment of the invention a method is provided for preparing a composition suitable for encapsulating semiconductor chips in which a master batch of glass fiber and poly (arylene sulfide) is melt compounded, the master batch is reduced to particles, and the master batch particles are then blended with a sufficient amount of organic silane, additional poly (arylene sulfide) and a component chosen from glass beads and fused silica to provide a composition as described above.

The poly (arylene sulfide) resins are known compounds which are set out in U.S. Pat. Nos. 3,354,129 and 3,919,177. The compositions contemplated in this invention contain the resin, substantial amounts of silica and/or glass as fillers and minor amounts of one or more other additives selected from among organic silane compounds, processing aids, colorants, and the like. Any additive selected will not adversely affect the performance of the final composition in its intended end use.

The glass can be present as glass fibers which are commercially available. In some instances it is desirable to substitute up to about 75 weight percent of the glass fibers contained in the compositions with glass beads to modify the effects contributed by the glass. The glass beads are also commercially available materials. Desirably the beads have average diameters ranging from about 10 to about 100 micrometers.

The silica, when employed in the compositions, can be ground natural silica or amorphous fused silica. Fused silica is commercially available as a finely ground material having a relatively narrow particle size distribution ranging from about 1 to about 100 micrometers. It typically is made up of about 99.5 weight percent $SiO_2$ with $Al_2O_3$, $Fe_2O_3$, $Na_2O$ and $K_2O$ as the remaining components.

The preferred poly (arylene sulfide) resins employed in the compositions are uncured or partially cured poly (phenylene sulfides) having melt flows ranging from about 100 to about 10,000 g/10 minutes according to ASTM Method D-1238-74 (316° C. and 5 kg load), more preferably from about 300 to about 5000 g/10 minutes, and mixtures thereof.

The organic silanes employed in the invention are commercially available materials. The silanes are added to the compositions to function as coupling agents, as agents to impart improved water resistance and, as agents to decrease linear coefficient of expansion of the compositions. Specific examples of compounds include gamma-glycidoxypropyltrimethoxysilane, methyltrimethoxysilane, polyisoxymethoxysilane, vinyltris(2-methoxyethoxy)silane, beta-(3,4-epoxycyclohexyl)-ethyltrimethoxysilane, N-beta(N-vinylbenzylamine)ethyl gamma-aminopropyltrimethoxysilane monohydrogen chloride, and the like. A presently preferred silane is the last compound of the above group because of its efficacy and relatively low toxicity.

The compositions contain about 30 to about 50 weight percent poly (arylene sulfide) resin, about 10 to about 30 weight percent glass fibers, about 30 to about 60 weight percent glass beads or fused silica, about 0.5 to about 3 weight percent organic silane, zero to about 2 weight percent processing aid, and zero to about 3 weight percent colorant. The processing aid, when employed can be selected from among polyethylene, metal carboxylates such as calcium stearate or zinc stearate and the like.

The colorant, when employed, can be selected from an inorganic or organic composition which will tolerate the high molding temperatures which can range from about 300°–600° C. (570°–1110° F.). Suitable colorants include carbon black, titanium dioxide, cadmium sulfide, phthalocyanine blue or green, cadmium sulfoselenide, iron oxide, and the like.

The compositions of the invention can be prepared, for example, by first mixing the components together at about room temperature in a rotating drum blender, or in an intensive mixer such as a Henschel mixture and extrusion compounding the resulting mixture to produce a uniform blend.

In a preferred mixing procedure, however, better results can be obtained by preparing a melt compounded masterbatch of the glass fiber and the poly (arylene sulfide) resin, e.g. 40 weight percent glass fiber and 60 weight percent resin. The masterbatch is then chopped, or otherwise reduced to particles. A suitable amount of the chopped material, virgin or partially cured resin, and the other components are then mixed and melt compounded as before to obtain the final blend.

The final blend, in chopped or pelleted form, is introduced into an injection molding apparatus and the resulting melt is used to encapsulate the semiconductor device(s), e.g., chip, which is positioned on the backing unit inserted in the mold with the leads connecting the internal components with the outside terminals secured in place. After the cooled piece is ejected from the mold, the part can be trimmed and/or separated into individual encapsulated units as is known in the art.

Since the leads are relatively fine wires, e.g. 1 mil, it is essential that the melt contacting them is sufficiently fluid and nonabrasive and the injection pressure not excessive to avoid displacement of the leads—commonly called producing a "washout" which means that a defective part is produced.

In addition to adequate melt flow and low lead washout qualities of the invention compositions, it is absolutely essential that the encapsulated items molded with them are not prone to cracking, are unaffected by high humidities or moisture, and are unaffected by a relatively high temperature environment which can be present in the end use applications,e.g. radios, television sets, computer modules, and the like.

Adequate melt flow properties of the compositions, e.g. about 300 to about 800 g/10 minutes, are provided by proper selection of the poly (arylene sulfide) resin component as noted before. Flow properties can also be enhanced by including a processing aid in the composition. Resistance to cracking and water resistance are enhanced by the organic silane. The quantity and types of fillers employed also contributes to cracking resistance. A balance of the components provides all of the qualities required in the final compositions.

EXAMPLE 1

A series of compositions was prepared by melt compounding portions of uncured and partly cured poly (phenylene sulfide), abbreviated as PPS, with portions, if used, of Owens-Corning 497 grade fiberglass chopped into about ⅛ inch (0.3 cm) lengths, glass beads, and natural ground silica that passes through a 325 mesh screen (U.S. Sieve Series), e.g. average particle diameter less than about 74 micrometers. After compounding, each sample was pelletized and the pellets were utilized in injection molding to encapsulate groups of 10 semiconductor chips, each group mounted on a backing frame with 1 mil diameter wires connecting the internal components with the outside terminals on the backing frame.

The melt temperature of each composition averaged about 350° C. during injection molding, mold temperature averaged 150° C., injection pressure of about 20.7 MPa was used and a cycle time of about 15-20 seconds.

After cooling, each encapsulated strip was ejected from the mold and inspected to determine if any cracks or displacement of loss (washout) of the 1 mil wires had occurred. Washout and/or cracking signifies a defective part has been produced.

The nature of the compositions employed and the results obtained are given in Table 1.

TABLE 1

| Sample No. | Control PPS Encapsulation Formulations, Parts by Weight | | | | | |
|---|---|---|---|---|---|---|
| | 1 | 2 | 3 | 4 | 5 | 6 |
| PPS,[a] MF = 75 | 27.5 | 27.5 | 25 | 27.5 | 22.5 | 27.5 |
| PPS, MF = 100 | 17.5 | 17.5 | 15 | 22.5 | 22.5 | 22.5 |
| Glass Fibers | 0 | 5 | 10 | 15 | 10 | 15 |
| Glass Beads 1[b] | 55 | 50 | 50 | 0 | 0 | 35 |
| Glass Beads 2[c] | 0 | 0 | 0 | 21 | 27 | 0 |
| Silica | 0 | 0 | 0 | 14 | 18 | 0 |
| Results | easy fill low washout | easy fill low washout | hard fill serious washout | easy fill low washout | easy fill serious washout | easy fill low washout |
| Composition MF | cracks nd[a] | cracks nd | no cracks nd | cracks nd | no cracks nd | no cracks 370 |

Notes:
[a]MF = melt flow
[b]average diameter = 10-53 micrometers
[c]average diameter = 74-149 micrometers
[d]nd = not determined Inspection of the results indicates with Sample 1 that a high loading of glass beads yield compositions having sufficient melt flow to fill the multicavity mold with low washout of the wires but that the encapsulated articles tend to crack after cooling. Replacing 5 percent of the glass beads with glass fibers as in Sample 2 produces results similar to those with Sample 1. Sample 3 results show that cracking can be eliminated by increasing the glass fiber content and decreasing the resin content but the composition has insufficient melt flow to fill the mold cavities properly resulting in serious washout of the wires. Formulations containing glass beads, glass fibers and ground silica are deficient in either yielding cracked specimens or serious washout as the results for samples 4.5 show. Sample 6 results indicate that compositions containing about 50 weight percent PPS, about 15 weight percent glass fibers and about 35 weight percent glass beads will produce compositions having sufficient melt flow, e.g. 370 g/10 minutes, to fill the mold cavities without serious disruption of the wires. Cooled specimens also did not crack. However, all of the encapsulated specimens exhibited vulnerability to high humidity conditions as evidenced by continuity failures after 1000 hours exposure times.

EXAMPLE 2

A series of compositions was prepared by melt compounding portions of particulate (as made) poly (phenylene sulfide) resin having a nominal melt flow of about 3100 g/10 minutes, Owens-Corning 497 grade fiberglass chopped into about ⅛ inch (0.3 cm) lengths, soda-lime-silica glass beads (commercially available) having a nominal diameter range of about 10-53 micrometers, and a specified organic silane compound. Unless indicated otherwise, a masterbatch consisting of 60 weight percent of the PPS and 40 weight percent fiberglass was employed in the compositions to furnish the glass fibers and a portion of the PPS. The silane and glass beads were premixed in a Henschel mixer.

Each composition was then employed in injection molding to encapsulate 10 semiconductor chips as before.

Following removal from the mold, a number of encapsulated specimens produced with each composition were tested for continuity after exposure to 85 percent relative humidity at 80° C. for a number of hours. In addition, the effects of temperature cycling from 25° C. to 95° C., 50 cycles in all, was determined for the samples. In this test, a 4 hour cycle was used: 2 hours in heating and 2 hours in cooling.

The quantities of components employed in parts by weight and the results obtained are given in Table 2.

TABLE 2

| Sample No. | 7 | 8 | 9 | 10 | 11 | 12[(1)] | 13 | 14 |
|---|---|---|---|---|---|---|---|---|
| PPS Encapsulation Composition | | | | | | | | |
| PPS | 50.00 | 49.25 | 48.50 | 47.75 | 52.75 | 48.50 | 47.75 | 48.50 |
| Glass Beads | 35.00 | 35.00 | 35.00 | 35.00 | 30.00 | 35.00 | 35.00 | 35.00 |
| Silane A[(2)] | —[(5)] | 0.75 | — | — | — | — | — | — |
| Silane B[(3)] | — | — | 1.50 | 2.25 | 2.25 | 1.50 | — | — |
| Silane C[(4)] | — | — | — | — | — | — | 2.25 | 1.50 |
| Fiberglass | 15.00 | 15.00 | 15.00 | 15.00 | 15.00 | 15.00 | 15.00 | 15.00 |
| | (Control) | Invention | Invention | Invention | Invention | (Comparison) | Invention | Invention |
| Test Results with Semiconductor Chips Encapsulated with above Compositions | | | | | | | | |
| Continuity, 80° C. 85% Relative Humidity Rejects % After | | | | | | | | |
| 1000 Hours | 41 | 11 | 9.0 | 0 | 10 | 27 | 16 | 17 |
| 2000 Hours | 55 | 74 | 9.0 | 0 | 43 | 27 | 16 | 43 |
| Temperature Cycling Rejects % After | | | | | | | | |
| 50 Cycles | — | — | 22 | 14 | 26 | 90 | 13 | 18 |

Notes:
[(1)] PPS-fiberglass masterbatch not employed, fiberglass added with other components.
[(2)] Methyltrimethoxysilane
[(3)] Epoxy functional, Dow-Corning Z6040
[(4)] N-beta-(N-vinylbenzylamine) ethyl gamma aminopropyltrimethoxysilane monohydrogen chloride
[(5)] A dash signifies material not added or test not made.

Inspection of the test results generally indicates that as the quantity of silane incorporated in the compositions increase from 0.75 to 2.25 weight percent, continuity failures of the encapsulated chips decreases.

In comparing the continuity and temperature cycling results for invention sample 9 with comparison sample 12 (both samples identical in makeup but differing in manner of compounding) it is apparent that the compounding technique employed is important to insure that optimum results are obtained. The test results clearly show, especially the temperature cycling results, that the preferred compounding technique involves the use of a PPS-fiberglass masterbatch (concentrate) to improve incorporation of the various additives with the resin.

In comparing continuity results for sample 10 (epoxy functional silane) with sample 13 (amine functional silane) it can be seen that the epoxy functional silane has an advantage. This is also suggested in comparing results of sample 9 with sample 14. On the other hand, the amine functional silane appears to be slightly favored based on the temperature cycling results. Because of the closeness of the test results with either silane and since the amine functional silane is deemed to be less toxic, the presently preferred silane in the encapsulation compositions is the amine functional silane.

I claim:

1. A method for preparing a composition suitable for molding said method comprising:
   (a) melt compounding a masterbatch of glass fiber and poly (arylene sulfide);
   (b) reducing said masterbatch to particles;
   (c) and blending said masterbatch particles with a sufficient amount of organic silane, additional poly (arylene sulfide) and a component chosen from glass beads and fused silica to provide a composition of about 30 to about 50 weight percent poly (arylene sulfide), about 10 to about 30 weight percent in glass fibers, about 30 to about 60 percent glass beads or fused silica, and about 0.5 to about 3 weight percent organic silane.

2. A method of claim 1 wherein said silane is chosen from among gamma-glycidoxypropyltrimethoxysilane, methyltrimethoxysilane, polyvisoxymethoxysilane, vinyltris(2-methoxyethoxy) silane, beta-(3,4-epoxycyclohexyl) ethyltrimethoxy silane, and N-beta(n-vinylbenzylamine)ethyl gamma-aminopropyltrimethoxysilane monohydrogen chloride.

3. A method of claim 1 wherein there is also blended into the composition in step (c), at least one of, up to about 2 weight percent of a processing aid and up to about 3 weight percent of a colorant.

4. A method of claim 1 or 3 wherein said component is glass beads.

5. A method of claim 1 or 3 wherein said component is fused silica.

6. A composition made by the method of claim 1.

7. A composition made by the method of claim 3.

8. A composition suitable for molding comprising:
   (a) from about 30 to about 50 weight percent poly (arylene sulfide), (b) from about 10 to about 30 weight percent glass fibers,
(c) from about 30 to about 60 weight percent of a component chosen from glass beads and fused silica, and
(d) about 0.5 to about 3 weight percent organic silane.

9. A composition of claim 8 also comprising:
(e) up to about 2 weight percent of a processing aid and (f) up to about 3 weight percent of a colorant.

10. A composition of claim 8 or 9 wherein said component is glass beads.

11. A composition of claim 8 or 9 wherein said component is fused silica.

12. A semiconductor chip encapsulated in a molded composition of claim 8 or 9.

13. A semiconductor chip encapsulated in a molded composition of claim 10.

14. A semiconductor chip encapsulated in a molded composition of claim 11.

15. A method for preparing an encapsulated semiconductor chip comprising
(1) introducing a semiconductor chip into an injection mold,
(2) introducing a melt of the molding composition of claim 8 or 9 into said mold surrounding said chip,
(3) subjecting said composition to molding conditions to produce a molded object,
(4) cooling said molded object, and
(5) releasing said molded object from the mold.

* * * * *